(12) United States Patent
Hwang et al.

(10) Patent No.: US 11,586,242 B2
(45) Date of Patent: Feb. 21, 2023

(54) PROTECTION MEMBER FOR DISPLAY DEVICE, DISPLAY DEVICE INCLUDING THE SAME AND METHOD FOR FABRICATING PROTECTION MEMBER

(71) Applicant: Samsung Display Co., Ltd., Yongin-si (KR)

(72) Inventors: Seong Jin Hwang, Suwon-si (KR); Sang Hoon Kim, Hwaseong-si (KR); Min Hoon Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/719,949

(22) Filed: Dec. 18, 2019

(65) Prior Publication Data
US 2020/0233457 A1 Jul. 23, 2020

(30) Foreign Application Priority Data

Jan. 18, 2019 (KR) .......................... 10-2019-0006863

(51) Int. Cl.
*G06F 1/16* (2006.01)
*G02B 1/14* (2015.01)
(Continued)

(52) U.S. Cl.
CPC .......... *G06F 1/1609* (2013.01); *C03C 17/002* (2013.01); *C03C 17/322* (2013.01); *C03C 17/324* (2013.01); *C03C 17/326* (2013.01); *G02B 1/14* (2015.01); *G06F 1/1652* (2013.01); *C03C 2218/328* (2013.01)

(58) Field of Classification Search
CPC .... G06F 1/1609; G06F 1/1652; G06F 1/1626; G06F 1/1637; G02B 1/14; C03C 17/322; C03C 17/324; C03C 17/326; C03C 17/002; C03C 2218/328; C03C 17/3405; C03C 17/32; C03C 2218/11; B32B 2457/20;
(Continued)

(56) References Cited

U.S. PATENT DOCUMENTS 8,929,085 B2 * 1/2015 Franklin .............. G09G 3/3208
361/749
9,189,016 B2 * 11/2015 Jang ...................... G06F 1/1637
(Continued)

FOREIGN PATENT DOCUMENTS

CN 201903728 U 7/2011
CN 103885239 6/2014
(Continued)

*Primary Examiner* — Rockshana D Chowdhury
(74) *Attorney, Agent, or Firm* — H.C. Park & Associates, PLC

(57) ABSTRACT

A protection member for a display device includes a first glass substrate having a first surface and a second surface opposed to each other in a thickness direction and side surfaces; and a first coating layer covering and in contact with the side surfaces of the first glass substrate, and including a first surface and a second surface opposed to each other in the thickness direction and having side surfaces, wherein the first surface of the first glass substrate is exposed via the first coating layer, and the first surface of the first coating layer is located in substantially the same extended plane of the first surface of the first glass substrate.

14 Claims, 16 Drawing Sheets

(51) Int. Cl.
*C03C 17/32* (2006.01)
*C03C 17/00* (2006.01)

(58) Field of Classification Search
CPC ..... B32B 17/10018; B32B 17/06; B32B 7/12; G09F 9/301
See application file for complete search history.

(56) References Cited

U.S. PATENT DOCUMENTS

| | | | | |
|---|---|---|---|---|
| 9,226,347 | B2* | 12/2015 | Weber | H01L 27/3276 |
| 9,282,653 | B2* | 3/2016 | Shedletsky | C03C 17/3441 |
| 9,286,826 | B2* | 3/2016 | Wright | H05K 1/115 |
| 9,348,450 | B1* | 5/2016 | Kim | G06F 1/1616 |
| 9,363,342 | B2* | 6/2016 | Shin | H04M 1/0268 |
| 9,411,455 | B2* | 8/2016 | Yoshikawa | G06F 1/1637 |
| 9,454,025 | B2* | 9/2016 | Zhong | G02F 1/13306 |
| 9,543,364 | B2* | 1/2017 | Rappoport | H04R 1/028 |
| 9,572,271 | B2* | 2/2017 | Mills | G01M 99/005 |
| 9,690,329 | B2* | 6/2017 | Jung | G06F 1/1626 |
| 9,698,362 | B2* | 7/2017 | Kim | H01L 51/0097 |
| 9,807,213 | B2* | 10/2017 | Stewart | G06F 1/1694 |
| 9,818,805 | B2* | 11/2017 | Choi | H01L 51/5246 |
| 9,865,844 | B1 | 1/2018 | Park et al. | |
| 9,874,904 | B2* | 1/2018 | Xu | G06F 1/1641 |
| 9,888,323 | B2* | 2/2018 | Kanemaki | H04M 1/03 |
| 9,958,715 | B2* | 5/2018 | Yuan | G06F 1/1637 |
| 9,989,995 | B2* | 6/2018 | Kwak | G06F 1/1656 |
| 9,996,114 | B2* | 6/2018 | Sun | H05K 5/0204 |
| 10,009,683 | B2* | 6/2018 | Choi | G02F 1/1333 |
| 10,028,395 | B2* | 7/2018 | Chen | G06F 1/1626 |
| 10,088,863 | B2* | 10/2018 | Rappoport | F21K 9/20 |
| 10,104,787 | B2* | 10/2018 | Rothkopf | H05K 5/0217 |
| 10,203,726 | B2* | 2/2019 | Rho | H04M 1/0254 |
| 10,254,853 | B2* | 4/2019 | Silvanto | G06F 3/0416 |
| 10,331,173 | B2* | 6/2019 | Cho | G09F 9/301 |
| 10,462,913 | B2* | 10/2019 | Jung | H05K 5/03 |
| 10,509,439 | B2* | 12/2019 | Choi | H04M 1/0266 |
| 10,564,749 | B2* | 2/2020 | Cheng | G06F 1/1626 |
| 10,568,218 | B1* | 2/2020 | Xu | H05K 1/189 |
| 10,691,163 | B2* | 6/2020 | Kim | H01L 51/529 |
| 10,715,920 | B2* | 7/2020 | Guo | H04R 9/02 |
| 10,716,223 | B2* | 7/2020 | Fordham | H04M 1/0266 |
| 10,817,030 | B2* | 10/2020 | Pelissier | G06F 1/1641 |
| 10,819,940 | B2* | 10/2020 | Kim | H04R 1/025 |
| 10,847,585 | B2* | 11/2020 | Choi | H04R 9/025 |
| 2007/0202933 | A1* | 8/2007 | Tolbert | B32B 27/308, 455/575.1 |
| 2011/0186345 | A1* | 8/2011 | Pakula | H04M 1/0202, 156/60 |
| 2011/0188180 | A1 | 8/2011 | Pakula et al. | |
| 2012/0243719 | A1* | 9/2012 | Franklin | G06F 1/1688, 381/333 |
| 2012/0262852 | A1* | 10/2012 | Cheng | G06F 1/1637, 361/679.01 |
| 2014/0072794 | A1* | 3/2014 | Rundle | C09J 7/26, 83/13 |
| 2014/0160694 | A1* | 6/2014 | Yoon | G02F 1/1339, 361/749 |
| 2014/0285735 | A1* | 9/2014 | Lin | G06F 1/1643, 349/12 |
| 2015/0004334 | A1* | 1/2015 | Bae | B32B 38/0008, 156/298 |
| 2015/0070826 | A1* | 3/2015 | Montevirgen | G06F 1/1656, 361/679.55 |
| 2015/0198747 | A1* | 7/2015 | Winarski | G02B 1/14, 361/679.21 |
| 2015/0198977 | A1* | 7/2015 | Takizawa | G06F 3/016, 345/173 |
| 2015/0234511 | A1* | 8/2015 | Wang | G06F 3/0412, 345/173 |
| 2015/0251604 | A1* | 9/2015 | Kukita | G02F 1/157, 359/266 |
| 2015/0274585 | A1* | 10/2015 | Rogers | C03C 21/002, 65/30.14 |
| 2016/0009226 | A1* | 1/2016 | Krebs | G02F 1/1337, 349/1 |
| 2016/0026222 | A1* | 1/2016 | Deng | G06F 3/041, 359/894 |
| 2016/0044801 | A1* | 2/2016 | Lee | H04M 1/0202, 361/679.55 |
| 2016/0070304 | A1* | 3/2016 | Shin | H04M 1/0268, 361/679.26 |
| 2016/0147262 | A1* | 5/2016 | Lee | G06F 1/1675, 345/173 |
| 2016/0147327 | A1* | 5/2016 | Choi | G06F 1/1652, 345/173 |
| 2016/0179139 | A1* | 6/2016 | Ahn | G06F 1/1686, 361/679.3 |
| 2016/0239051 | A1* | 8/2016 | Lee | G06F 1/1652 |
| 2017/0002237 | A1* | 1/2017 | Cho | C09J 133/08 |
| 2017/0008458 | A1* | 1/2017 | Olesen | B60R 1/04 |
| 2017/0052566 | A1* | 2/2017 | Ka | H04R 3/12 |
| 2017/0101340 | A1* | 4/2017 | Inoue | C09J 7/22 |
| 2017/0177032 | A1* | 6/2017 | Cheng | G06F 1/1656 |
| 2017/0344053 | A1* | 11/2017 | Kim | G06F 1/1637 |
| 2018/0011565 | A1* | 1/2018 | Nekimken | B32B 37/003 |
| 2018/0024401 | A1* | 1/2018 | Stray | G02B 17/04, 359/876 |
| 2018/0046220 | A1* | 2/2018 | Kim | H01L 23/4985 |
| 2018/0107312 | A1* | 4/2018 | Wang | G06F 3/0412 |
| 2018/0284845 | A1* | 10/2018 | Honma | B29C 66/7392 |
| 2019/0302849 | A1* | 10/2019 | Lee | G09F 9/301 |
| 2020/0363900 | A1* | 11/2020 | Franklin | G06F 3/0416 |

FOREIGN PATENT DOCUMENTS

| | | |
|---|---|---|
| CN | 106024830 | 10/2016 |
| CN | 107545847 | 1/2018 |
| CN | 108281570 | 7/2018 |
| KR | 10-2013-0061812 | 6/2013 |
| KR | 10-1484452 | 2/2015 |
| KR | 10-2015-0051459 | 5/2015 |
| KR | 10-2017-0085420 | 7/2017 |

* cited by examiner

PROTECTION MEMBER FOR DISPLAY DEVICE, DISPLAY DEVICE INCLUDING THE SAME AND METHOD FOR FABRICATING PROTECTION MEMBER

CROSS REFERENCE TO RELATED APPLICATION

This application claims priority from and the benefit of Korean Patent Application No. 10-2019-0006863 filed on Jan. 18, 2019 which is hereby incorporated by reference for all purposes as if fully set forth herein.

BACKGROUND

Field

Exemplary implementations of the invention relate generally to a display device and, more specifically, to a protection member for a display device, a display device including the same, and a method for fabricating the protection member for a display device.

Discussion of the Background

Display devices are for displaying images and include a display panel such as an organic light-emitting display panel or a liquid-crystal display panel. Such a display device may include a protection member for protecting a display panel from an external impact, such as a window. In particular, the window is frequently employed by portable electronic devices such as smart phones.

A transparent film or glass may be used as the substrate of the window. The film is flexible compared to glass and thus can be easily applied to a flexible display device. However, it is vulnerable to scratches. Glass is stronger than the film and can have certain flexibility when it is made thin or ultra thin. However, when glass is broken, the splinters scatter and accordingly a user may be injured.

The above information disclosed in this Background section is only for understanding of the background of the inventive concepts, and, therefore, it may contain information that does not constitute prior art.

SUMMARY

Applicant discovered that during the process of attaching an anti-scattering film onto a glass window of a display to prevent scattering of the splinters of the broken glass, the side surfaces of the film and glass window may not be aligned with one another in the process of stacking the layers during manufacture due to assembly tolerances. As a result, protruding portions may occur resulting in poor assembly and/or lowering the process efficiency.

Protection members for display devices constructed according to the principles and exemplary implementations of the invention, and methods for fabricating the protection member according to the principles of the invention, are capable of preventing scattering of glass splinters and eliminating protruding portions.

For example, the side surfaces of a plurality of layers of protection members constructed according to the principles of the invention can be aligned with one another without protrusions, thereby reducing the assembly tolerance required to install the protection members in a display device. As a result, the process capability and the process efficiency during manufacture can be improved.

Display devices including protection members constructed according to the principles and exemplary implementations of the invention and are capable of preventing scattering of glass splinters and can be easily assembled with reduced assembly tolerance.

In addition, in methods of fabricating protection members according to the principles of the invention, the side surfaces of a plurality of layers of the protection member can be aligned with one another without directly cutting a glass substrate.

Additional features of the inventive concepts will be set forth in the description which follows, and in part will be apparent from the description, or may be learned by practice of the inventive concepts.

According to an aspect of the invention, a protection member for a display device includes a first glass substrate having a first surface and a second surface opposed to each other in a thickness direction and side surfaces; and a first coating layer covering and in contact with the side surfaces of the first glass substrate, and including a first surface and a second surface opposed to each other in the thickness direction and having side surfaces, wherein the first surface of the first glass substrate is exposed via the first coating layer, and the first surface of the first coating layer is located in substantially the same extended plane of the first surface of the first glass substrate.

The second surface of the first coating layer may cover and contacts the second surface of the first glass substrate.

The second surface of the first coating layer may be substantially parallel to the first surface of the first coating layer and the first surface of the first glass substrate.

The protection member may further include a first coupling layer may be disposed on the second surface of the first coating layer; and a first film layer may be disposed on a second surface of the first coupling layer, wherein the side surfaces of the first coating layer, side surfaces of the first coupling layer and side surfaces of the first film layer may be all aligned in substantially the same plane.

The protection member may further include a second coupling layer disposed on a second surface of the first film layer; and a second film layer disposed on a second surface of the second coupling layer, wherein the side surfaces of the first coating layer, the side surfaces of the first coupling layer, the side surfaces of the first film layer, side surfaces of the second coupling layer and side surfaces of the second film layer may be all aligned in substantially the same alignment plane.

The protection member may further include a second coupling layer disposed on a second surface of the first film layer; a second glass substrate disposed on a second surface of the second coupling layer; and a second coating layer may cover side surfaces of the second glass substrate and the second surface of the second glass substrate, the second coating layer contacting the side surfaces of the second glass substrate and the second surface of the second glass substrate; wherein the side surfaces of the first coating layer, the side surfaces of the first coupling layer, the side surfaces of the first film layer, side surfaces of the second coupling layer and side surfaces of the second coating layer may be all aligned in substantially the same plane.

The protection member may further include a second coupling layer disposed on a second surface of the first film layer; and a second glass substrate and a second coating layer disposed on a second surface of the second coupling layer, wherein the second coating layer may cover side surfaces of the second glass substrate and a first surface of the second glass substrate, the second coating layer may contact the side surfaces of the second glass substrate and the first surface of the second glass substrate, a second surface of the second coupling layer contacts a first surface of the second coating layer, and wherein the side surfaces of the first functional coating layer, the side surfaces of the first coupling layer, side surfaces of the first film layer, side surfaces of the second coupling layer and side surfaces of the second coating layer may be all aligned in substantially the same plane.

The protection member may further include a first coupling layer disposed on the second surface of the first coating layer; a second glass substrate disposed on a second surface of the first coupling layer; and a second coating layer may cover side surfaces of the second glass substrate and a second surface of the second glass substrate, the second coating layer contacting the side surfaces of the second glass substrate and the second surface of the second glass substrate, wherein the side surfaces of the first coating layer, side surfaces of the first coupling layer and side surfaces of the second coating layer may be all aligned in substantially the same plane.

The first glass substrate may include a compressive stress region near a surface thereof and a central tensile region therein, and a second glass substrate and a second coating layer disposed on a second surface of the first coupling layer, wherein the second coating layer may cover side surfaces of the second glass substrate and a first surface of the second glass substrate, the second coating layer may contact the side surfaces of the second glass substrate and the first surface of the second glass substrate, wherein a second surface of the first coupling layer may contact a first surface of the second coating layer, and wherein the side surfaces of the first coating layer, the side surfaces of the first coupling layer and side surfaces of the second coating layer may be all aligned in substantially the same plane.

The first glass substrate may include a compressive stress region near a surface thereof and a central tensile region therein, and wherein the compressive stress region may be disposed near the first surface of the first glass substrate, the second surface of the first glass substrate and the side surfaces of the first glass substrate.

The first coating layer may be a functional coating layer including at least one of: an epoxy acrylate resin, a polyester acrylate resin, a polyether acrylate resin, a urethane acrylate resin, an acryl acrylate resin, an unsaturated polyester, a urethane resin, an acrylonitrile butadiene styrene (ABS) resin, and a rubber.

The side surfaces of the first coating layer may be formed by cutting.

According to another aspect of the invention, a display device includes a display panel; and a protection member disposed on a surface of the display panel, wherein the protection member includes a glass substrate having a first surface and a second surface opposed to each other in a thickness direction and side surfaces, a coating layer covering and contacting the side surfaces of the glass substrate, the coating layer including a first surface and a second surface opposed to each other in the thickness direction and side surfaces, a coupling layer disposed on a second surface of the coating layer, and a film layer disposed on a second surface of the coupling layer, wherein the side surfaces of the coating layer, side surfaces of the coupling layer and side surfaces of the film layer are all aligned in substantially the same plane.

Side surfaces of the protection member may extend outwardly from respective side surfaces of the display panel.

The glass substrate may be tempered glass, and the film layer includes an anti-scattering film.

The coating layer may be a functional coating layer including at least one of: an epoxy acrylate resin, a polyester acrylate resin, a polyether acrylate resin, a urethane acrylate resin, an acryl acrylate resin, an unsaturated polyester, a urethane resin, an acrylonitrile butadiene styrene (ABS) resin, and a rubber.

The display device may be a foldable display device, and the coupling layer may have creep properties of about 50% to about 800%.

According to still another aspect of the invention, a method for fabricating a protection member for a display panel, the method includes the steps of: preparing a glass substrate having a first surface and a second surface opposed to each other in a thickness direction and side surfaces; coating a functional composition on the glass substrate to form a coating layer covering the second surface of the glass substrate and the side surfaces of the glass substrate; and cutting edge portions of the coating layer that are disposed outwardly from the side surfaces of the glass substrate.

The step of cutting the edge portions of the coating layer may include cutting with an irradiating laser.

The method may further include the step of: after the forming the coating layer, sequentially stacking a coupling layer and a film layer on a second surface of the coating layer, wherein the cutting step further include cutting the film layer, the coupling layer and the coating layer in a single process.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
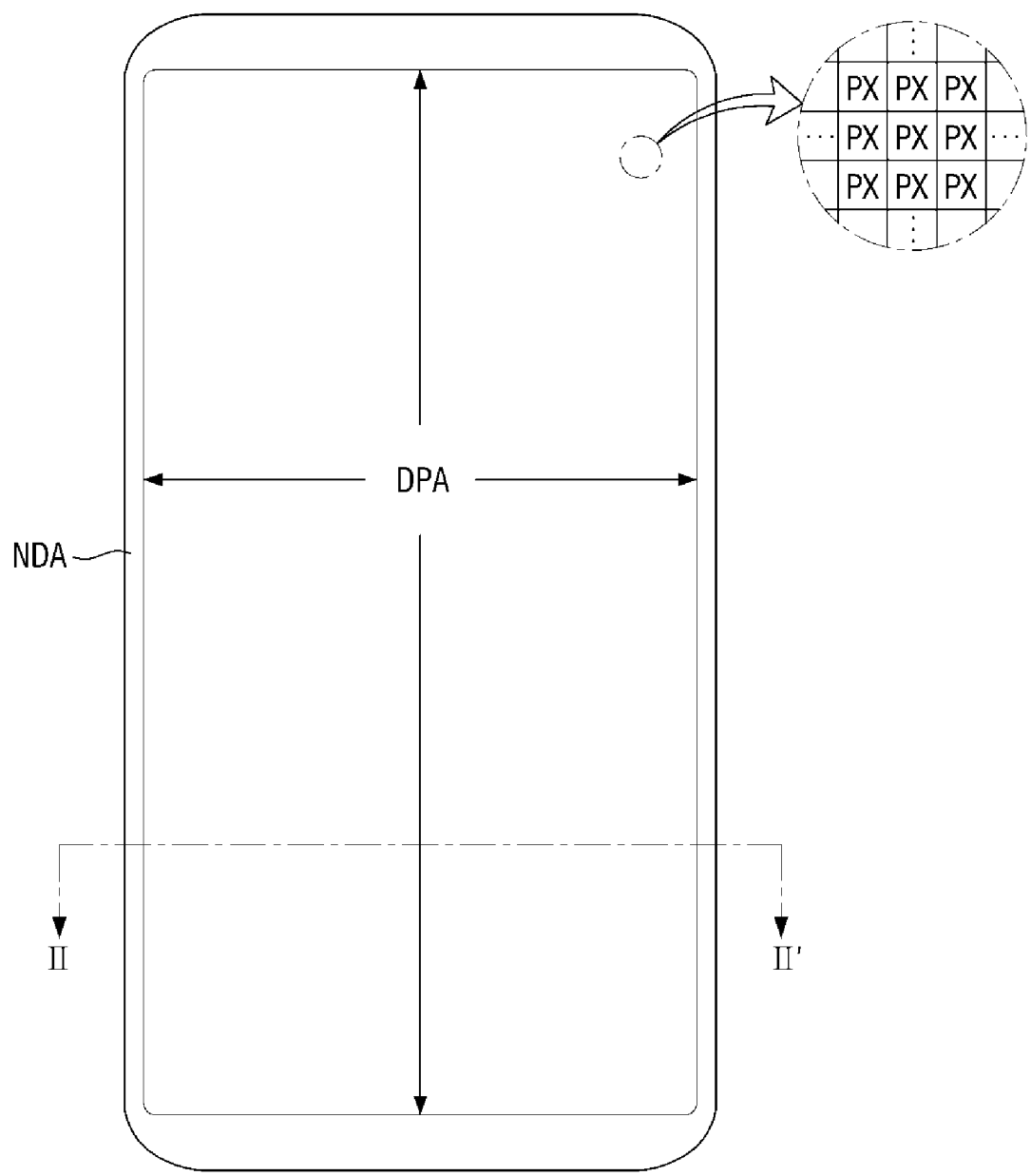
FIG. 1 is a plan view of an exemplary embodiment of a display device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the invention will be described with reference to the accompanying drawings.

FIG. 1 is a plan view of an exemplary embodiment of a display device constructed according to the principles of the invention.

Referring to FIG. 1, a display device 10 is operable to display pictures and/or images in a display area DPA, and may include various devices in addition to the display area DPA. Examples of the display device 10 include, but are not limited to, a smart phone, a mobile phone, a tablet PC, a personal digital assistant (PDA), a portable multimedia player (PMP), a television set, a game machine, a wrist-watch-type electronic device, a head-mounted display, a personal computer monitor, a laptop computer, a car navigation system, a car instrument cluster, a digital camera, a camcorder, an outdoor billboard, an electronic billboard, various medical apparatuses, various inspection devices, various home appliances including a display area such as a refrigerator and a laundry machine, Internet of things (IoT) devices, etc.

The display device 10 includes a display area DPA and a non-display area NDA. In the display area DPA, images are displayed during operation. In the non-display area NDA, images are not displayed.

A plurality of pixels PX may be disposed in the display area DPA. Each pixel PX is a unit for displaying an image. The pixels PX may include, but is not limited to, a red pixel, a green pixel and a blue pixel. The plurality of pixels PX may be arranged alternately when viewed from the top. For example, the pixels PX may be arranged in, but is not limited to, a matrix.

The non-display area NDA may be disposed around the display area DPA. The non-display area NDA may be disposed around the display area DPA to surround it. In an exemplary embodiment, the display area DPA may be formed in a generally rectangular shape when viewed in plan, and the non-display area NDA may be disposed along the four sides of the display area DPA. It is, however, to be understood that the exemplary embodiments are not limited thereto.

Figure 2:
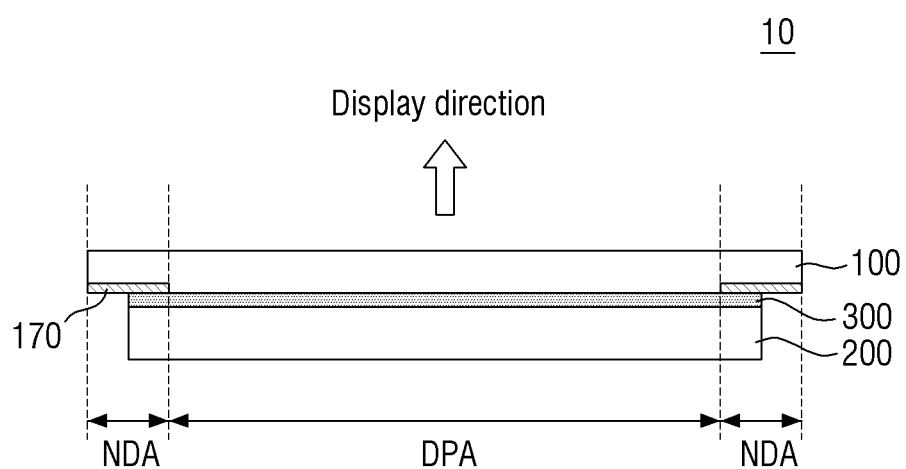
FIG. 2 is a cross-sectional view taken along line II-II' of FIG. 1.

FIG. 2 is a cross-sectional view taken along line II-II' of FIG. 1.

Referring to FIG. 2, the display device 10 includes a display panel 200 and a protection member 100 for a display device which is disposed on the display surface of the display panel 200.

The display panel 200 may include a self-luminous display panel such as an organic light-emitting display panel (OLED), an inorganic light-emitting display panel (inorganic EL), a quantum-dot light-emitting display panel (QED), a micro LED display panel (micro-LED), a nano LED display panel (nano-LED), a plasma display panel (PDP), a field emission display panel (FED) and a cathode ray display panel (CRT), as well as a light-receiving display panel such as a liquid-crystal display panel (LCD) and an electrophoretic display panel (EPD), or other types of display panels known in the art.

The protection member 100 for a display device is disposed on the display surface of the display panel 200. As used herein, the display surface of the display panel 200 refers to the surface of the display panel 200 through which light exits to display images. When the display device 10 is a double-sided display device or a transmissive display device that have two display surfaces, the protection member 100 may be disposed on either or both surfaces.

The protection member 100 for a display device may be referred to as a window, a protective glass, a protective film, a cover member, a cover glass, a cover film, a cover sheet and the like. In the following description, the protection member for a display device will be referred to as the protection member 100 for convenience of illustration.

The protection member 100 may have a larger surface area than the display panel 200. In this case, the entirety of the display panel 200 overlaps the protection member 100 in the thickness direction. The side surfaces of the protection member 100 may protrude outward from the respective side surfaces of the display panel 200. The protection member 100 may protrude from all the sides of the display panel 200. For example, when the display panel 200 has a rectangular shape, the protection member 100 may protrude from both longer sides and both shorter sides of the display panel 200. The protection member 100 may protrude from the sides of the display panel 200 by equal or different amounts.

The protection member 100 may further include a print layer 170 disposed at edge areas. The print layer 170 is disposed in the non-display area NDA. The print layer 170 may be an edge coating layer. The print layer 170 may be a decorative layer providing aesthetic effects and/or the outermost black matrix layer. The print layer 170 may separate the display area DPA from the non-display area NDA. In other words, the inner edge of the print layer 170 may be at the boundary between the display area PDA and the non-display area NDA. Although the outer sides of the print layer 170 may be aligned with the side surfaces of the protection member 100, respectively, this is merely illustrative. The outer sides of the print layer 170 may be located more to the inside thereof. The display panel 200 may be overlapped with at least a part of the print layer 170 in the thickness direction.

The print layer 170 may be disposed either on the surface of the protection member 100 or inside the protection member 100. As will be described later, the protection member 100 is made up of multiple layers, and an intermediate layer may be selected as a layer on which the print layer 170 is coated as well as the outermost layers.

The protection member 100 may be attached on the display panel 200 through a transparent layer 300 such as an optical transparent adhesive (OCA) and an optical transparent adhesive resin (OCR).

The display device 10 may further include a touch member. The touch member may be disposed between the display device 10 and the protection member 100 as a separate panel or a film, and may be formed directly on the display panel 200, or may be formed inside the display panel 200.

Hereinafter, the above-described protection member 100 will be described in more detail.

Figure 3:
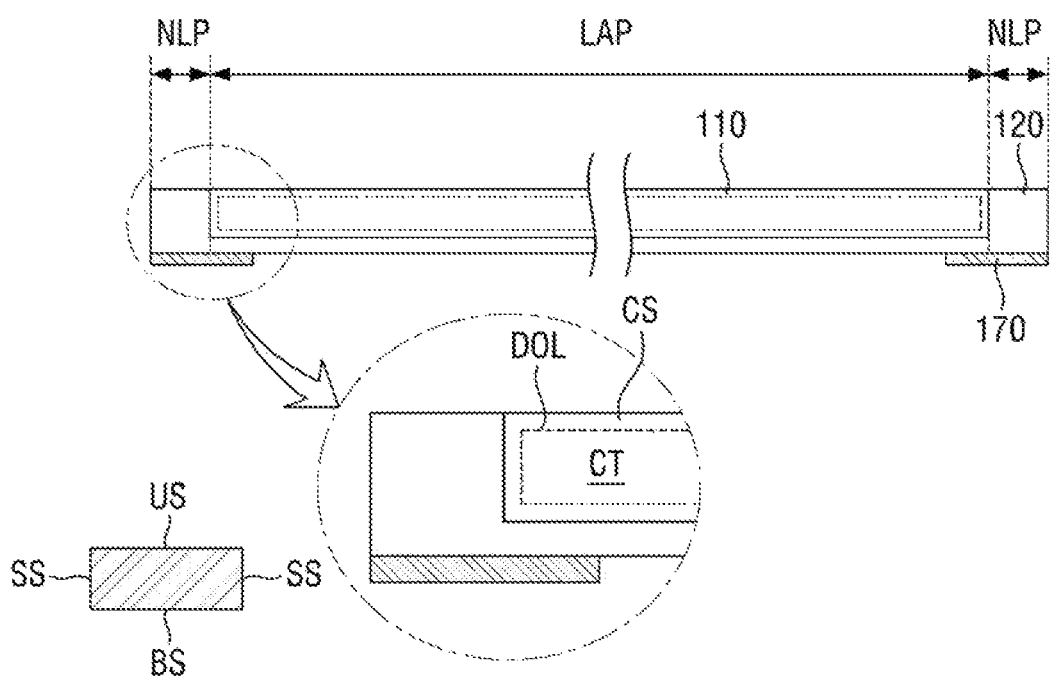
FIG. 3 is a cross-sectional view of an exemplary embodiment of a protection member constructed according to the principles of the invention.

FIG. 3 is a cross-sectional view of an exemplary embodiment of a protection member constructed according to the principles of the invention.

Referring to FIG. 3, the protection member 100 includes a glass substrate 110 and a functional coating layer 120 disposed on the glass substrate 110.

The glass substrate 110 may have a plate-like sheet shape having a predetermined thickness. The glass substrate 110 may have a shape generally similar to the shape of the display device 10 to which the protection member 100 is applied when viewed from the top. When the display device 10 has a rectangular shape, the glass substrate 110 may also have a rectangular shape when viewed from the top.

The glass substrate 110 may include ultra thin glass (UTG) or thin glass. As the glass substrate 110 is implemented as an ultra thin or thin glass, the glass substrate 110 may have flexibility. Specifically, the glass substrate 110 may be curved, bent, folded and rolled. The thickness of the glass substrate 110 may be in the range of, e.g., about 10 µm to about 300 µm. In an exemplary embodiment, the glass substrate 110 having a thickness of about 30 µm to about 80 µm or about 50 µm may be employed.

The glass substrate 110 may include soda lime glass, alkali alumino silicate glass, borosilicate glass, or lithium alumina silicate glass.

The glass substrate 110 may include chemically or thermally tempered glass to have a high strength. The chemical tempering may be carried out via an ion exchange process in an alkali salt. The ion exchange process may be performed two or more times.

The tempered glass substrate 110 may have a stress profile in the depth direction from the surface. For example, the glass substrate 110 may include a compressive stress region CS near the surface and a central tension region CT inside. In the tempered glass substrate 110, stress is typically the largest at the surface and decreases toward the inside. A depth of stress line DOL is defined at the boundary between the compressive stress region CS and the central tension region CT.

The glass substrate 110 may be formed by chopping a mother glass into cells and tempering them. The process of tempering the glass forms the compressive stress region CS near the surface. For example, when the ion exchange process is carried out, the ions of the alkali salt and the glass are interchanged on the surface. The exchanged ions are diffused into the glass to form the compressive stress region CS having the predetermined depth of stress line DOL. If the ion exchange process is carried out after the glass substrate 110 is chopped into cells, ion exchange may be performed on the side surfaces SS of the glass substrate 100 in addition to the upper surface US and the bottom surface BS. Therefore, the compressive stress region CS may be formed not only near of the upper surface US and the bottom surface BS of the glass substrate 110 but also near the side surfaces SS.

As the compressive stress region CS is formed near the surface of the glass substrate 110, the surface of the glass substrate 110 may not be easily scratched. That is to say, the surface of the glass substrate 110 may have good anti-scratch properties.

The functional coating layer 120 is disposed on the side surfaces SS and the bottom surface BS of the glass substrate 110. The functional coating layer 120 protects the glass substrate 110 and prevents or mitigates the scattering of the splinters 110 if the glass substrate 110 is broken, thereby reducing the risk that a user is injured. The functional coating layer 120 may further include a shock absorbing function. In addition, the functional coating layer 120 may prevent direct impact on the glass substrate 110 during the process of cutting for alignment. A detailed description thereof will be given herein.

In an exemplary embodiment, the functional coating layer 120 may be formed directly on the side surfaces SS and the bottom surface BS of the glass substrate 110. The functional coating layer 120 may be in contact with the side surfaces SS and the bottom surface BS of the glass substrate 110. The functional coating layer 120 may be coated by, for example, slit coating, bar coating, spin coating, glass direct molding (GDM), glass direct printing (GDP), etc. It is, however, to be understood that the exemplary embodiments are not limited thereto. The functional coating layer 120 may be cured by heat or UV irradiation after it is coated.

The side surfaces SS and the bottom surface BS of the glass substrate 110 may be covered by the functional coating layer 120. In an exemplary embodiment, the side surfaces SS and the bottom surface BS of the glass substrate 110 may be completely covered by the functional coating layer 120. The upper surface US of the glass substrate 110 may be exposed without being covered by the functional coating layer 120. The exposed upper surface US of the glass substrate 110 may be the outer surface of the display device 10 on the display side. According to this exemplary embodiment, the glass substrate 110 has a higher strength than films and forms the upper surface US of the protection member 100, thereby exhibiting good anti-scratch properties.

The upper surface US of the functional coating layer 120 and the upper surface US of the glass substrate 110 may be in contact with each other with no level difference, i.e., flush. In an exemplary embodiment, the upper surface US of the functional coating layer 120 may be at the same level as the upper surface US of the glass substrate 110 and may be in substantially the same plane or in an extended plane of the upper surface US of the glass substrate 110. The bottom surface BS of the functional coating layer 120 may be substantially parallel to the upper surface US of the functional coating layer 120 and/or the upper surface of the glass substrate 110 and may be substantially parallel to the bottom surface BS of the glass substrate 110 as well.

The functional coating layer 120 may be divided into a substrate overlapping portion LAP and an outer protruding portion NLP depending on whether the portions overlap with the glass substrate 110 in the thickness direction. The substrate overlapping portion LAP is located on the bottom surface BS of the glass substrate 110 and overlaps the bottom surface BS of the glass substrate 110. The outer protruding portion NLP projects outwardly from the side surface SS of the glass substrate 110. The outer protruding portion NLP is thicker than the substrate overlapping portion LAP. The thickness of the outer protruding portion NLP may be substantially equal to the sum of the thickness of the substrate overlapping portion LAP and the thickness of the glass substrate 110 overlapping it. The thickness of the substrate overlapping portion LAP may be smaller than the thickness of the glass substrate 110. For example, the thickness of the substrate overlapping portion LAP may range from 0.5 to 10 µm.

The outer surfaces SS of the functional coating layer 120 may lie on the same plane as the thickness direction. That is to say, the outer surfaces SS of the functional coating layer 120 may be generally perpendicular to the bottom surface BS of the glass substrate 110 (or the bottom surface BS of the functional coating layer 120) and the upper surface US of the functional coating layer 120 (and/or the upper surface US of the glass substrate 110). The outer surfaces SS of the functional coating layer 120 and the side surfaces SS of the glass substrate 110 facing the outer surface SS, respectively, may be substantially parallel to each other. It is, however, to be understood that the exemplary embodiments are not limited thereto. The functional coating layer 120 may project outwardly from the side surface SS of the glass substrate 110 by, for example, 1 to 100 μm. The outer surfaces SS of the functional coating layer 120 may be a cut surface (e.g., a laser cut surface) obtained by a cutting process.

The functional coating layer 120 may include a resin. For example, the functional coating layer 120 may include at least one of: an epoxy acrylate resin, a polyester acrylate resin, a polyether acrylate resin, a urethane acrylate resin, an acryl acrylate resin, an unsaturated polyester, a urethane resin, an acrylonitrile butadiene styrene (ABS) resin, and a rubber. In some exemplary embodiments, the functional coating layer 120 may be made of a hybrid material of organic/inorganic materials.

The print layer 170 may be disposed on the bottom surface BS of the functional coating layer 120. The print layer 170 may be aligned with the outer surfaces SS of the functional coating layer 120 to cover the outer protruding portions NLP of the functional coating layer 120 and may extend inwardly to overlap with a part of the substrate overlapping portion LAP of the functional coating layer 120.

As described above, according to the exemplary embodiment, the side surfaces SS of the glass substrate 110 are not exposed to the outside but are covered and protected by the functional coating layer 120. The side surfaces SS of the functional coating layer 120 form the side surfaces SS of the protection member 100, but the side surfaces SS of the glass substrate 110 do not. As a result, the protection member 100 has even side surfaces SS and thus the assembly tolerance can be reduced. A detailed description thereof will be given herein with reference to the exemplary embodiment shown in FIG. 4.

The protection member 100 may further include a front coating layer disposed on the upper surface US of the glass substrate 110. The front coating layer may perform one or more of the following functions: anti-reflection, anti-fingerprint, antibacterial properties, blue light blocking, electromagnetic shielding, privacy features, etc. The front coating layer may be wet-coated with a fluorine based coating liquid or dry-coated by vacuum deposition. It is, however, to be understood that the exemplary embodiments are not limited thereto.

Figure 4:
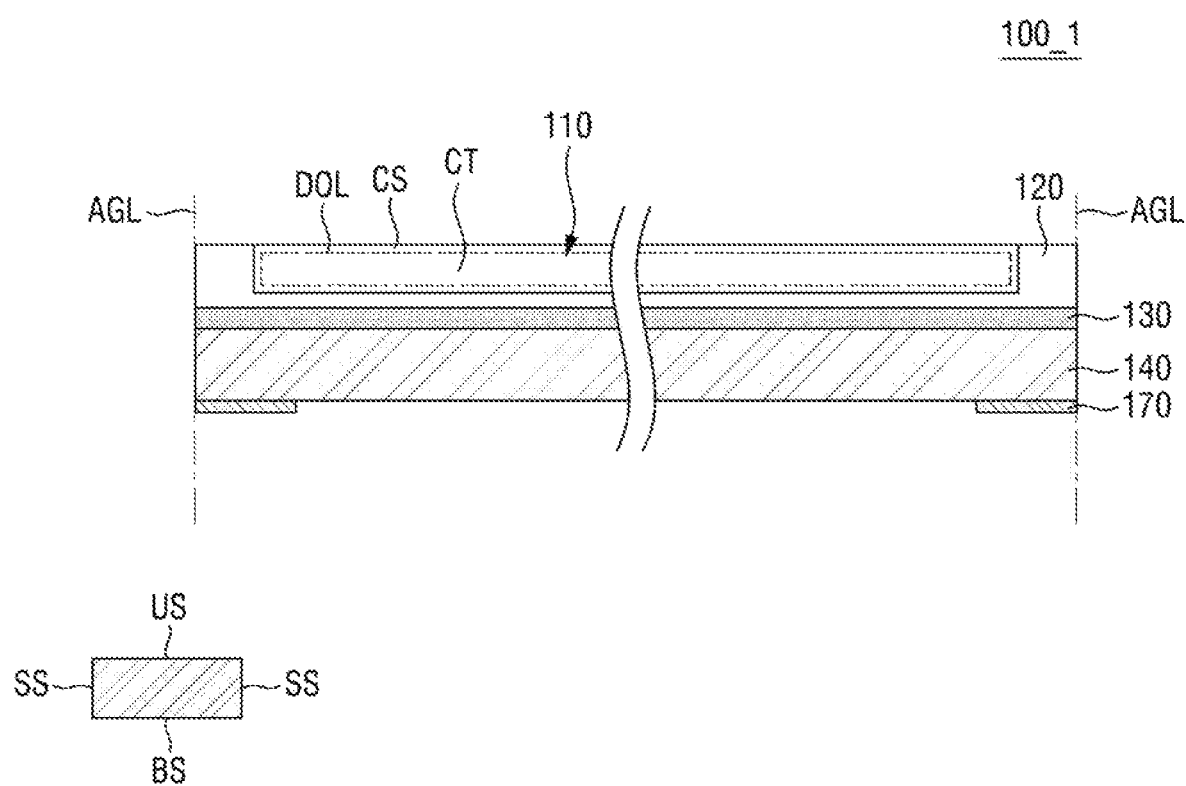
FIG. 4 is a cross-sectional view of another exemplary embodiment of a protective member constructed according to the principles of the invention.

FIG. 4 is a cross-sectional view of another exemplary embodiment of a protection member constructed according to the principles of the invention.

A protection member 100_1 according to the exemplary embodiment shown in FIG. 4 is different from the exemplary embodiment shown in FIG. 3 in that it further includes other layers stacked on the bottom surface BS of the functional coating layer 120.

Specifically, a coupling layer 130 is disposed on the bottom surface BS of the functional coating layer 120, and a film layer 140 is disposed on the bottom surface BS of the coupling layer 130.

The coupling layer 130 is interposed between the functional coating layer 120 and the film layer 140 to couple them together. The coupling layer 130 is preferably a detachable layer, but may be an adhesive layer. The coupling layer 130 may have an adhesive strength of at least 500 gf/in at room temperature (25° C.) and 50% humidity to prevent the functional coating layer 120 and/or the glass substrate 110 from peeling off from the display panel 200. Also, in order to endure an external impact and to achieve a restoring force from deformation, the coupling layer 130 may have a storage modulus of approximately 80 to 120 MPa under the above-mentioned conditions. In addition, the coupling layer 130 may be able to creep to alleviate stress during folding or bending, and may have creep properties of 50% to 800% under the above-mentioned conditions. The coupling layer 130 may include one of an acrylic resin, a silicone resin, an epoxy resin, a urethane resin, and a composite resin thereof.

The film layer 140 coupled to the bottom surface BS of the glass substrate 110 through the coupling layer 130 may prevent scattering of glass splinters. For example, even if the glass substrate 110 is broken, the splinters of the broken glass are attached to the film layer 140, thereby preventing them from scattering. The film layer 140 may perform other functions such as impact resistance, in addition to the anti-scattering function.

If the film layer 140 includes an anti-scattering film, the film layer 140 may include a transparent polymeric resin. The transparent polymeric resin of the film layer 140 may include at least one selected from the group consisting of: polyethylene terephthalate (PET), polyethylene naphthalate (PEN), polyether sulfone (PES), polyimide (PI), polyarylate (PAR), polycarbonate (PC), polymethyl methacrylate (PMMA) and cyclo olefin vopolymer (COC).

The widths of the film layer 140 and the coupling layer 130 are larger than the width of the glass substrate 110 so that they protrude outwardly from the side surfaces SS of the glass substrate 110. The side surfaces of each of film layer 140 and the coupling layer 130 may be aligned with the side surfaces SS of the glass substrate 140, respectively. That is to say, the side surfaces SS of the functional coating layer 120, the coupling layer 130 and the film layer 140 may all be aligned in a same alignment plane AGL or a straight alignment line in the cross-sectional view. The side surfaces of each of film layer 140 and the coupling layer 130 may be cut surfaces like the side surfaces SS of the functional coating layer 120.

The protection member 100_1 may further include a print layer 170. The outer surfaces of the print layer 170 may be aligned with the same alignment plane AGL, but this is merely illustrative. According to the exemplary embodiment shown in FIG. 4, the print layer 170 is disposed on the bottom surface BS of the film layer 140, unlike the exemplary embodiment shown in FIG. 3. However, it should be noted that the print layer 170 may be disposed at another position in the thickness direction. For example, the print layer 170 may be formed on the bottom surface BS of the functional coating layer 120 in the exemplary embodiment shown in FIG. 4. In such case, the print layer 170 may be interposed between the functional coating layer 120 and the coupling layer 130. For another example, the print layer 170 may be formed across the upper surface US of the functional coating layer 120 and the upper surface US of the glass substrate 110 or may be formed on the upper surface US of the film layer 140. In addition, a plurality of print layers 170 may be disposed at different positions such that they overlap one another at least partially in the thickness direction.

As described above, in the protection member 100_1 according to this exemplary embodiment having the stacked structure where the glass substrate 110 and the film layer 140 are coupled together, although the film layer 140 protrudes from the side surfaces SS of the glass substrate 110, the side surfaces SS of the functional coating layer 120, the coupling layer 130 and the film layer 140, which form the side surfaces SS of the protection member 100_1, are aligned with one another, such that the protection member 100_1 has even side surfaces. Therefore, the assembly tolerance can be reduced during the process of attaching the protection member 100_1 to the display panel 200 and installing it in the set (chassis, bracket, etc.) of the display device 10, so that the process capability and the process efficiency are improved.

In addition, the glass substrate 110 is protected by the functional coating layer 120, the coupling layer 130, the film layer 140, etc., so that it is possible to improve the impact resistance properties and to prevent scattering of splinters when the glass substrate 110 is broken.

The even side surfaces SS of the protection member 100_1 can be achieved through the processes of cutting each of layers of the protection member 100_1 at the same time after all the layers of the protection member 100_1 are stacked. Since the cut surface is not directly in contact with the glass substrate 110 but is located more to the outside than the glass substrate 110, it is possible to suppress the impact generated during the cutting process from being transferred to the glass substrate 110. More detailed descriptions thereof will be given with reference to FIGS. 5 to 7.

Figure 5:
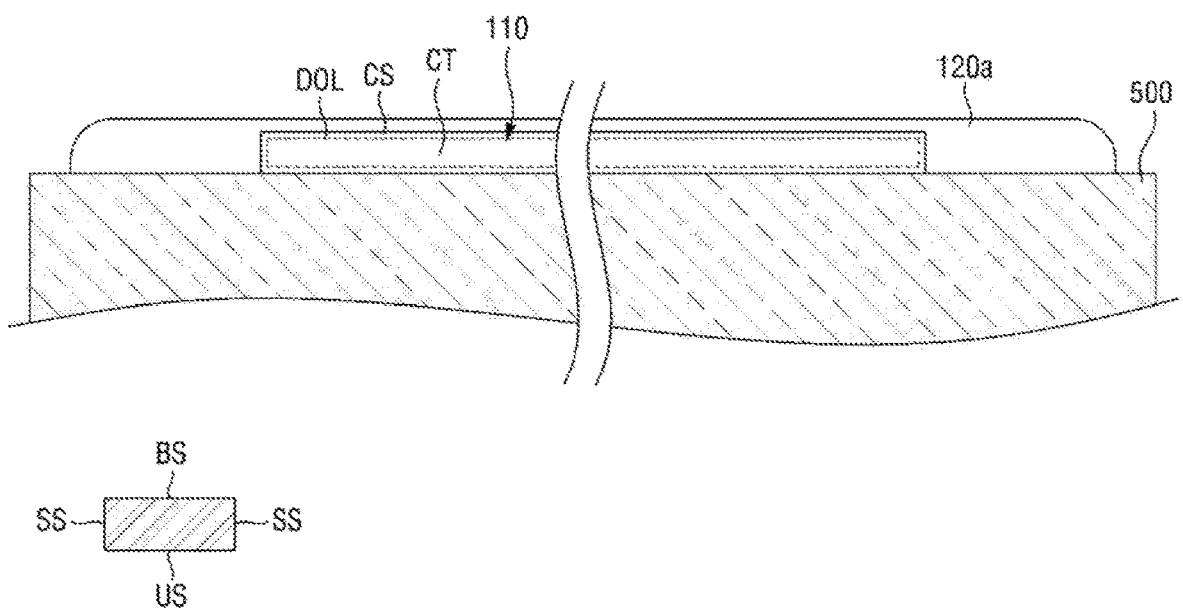
FIGS. 5, 6, and 7 are cross-sectional views showing processing steps of a method of fabricating the protection member shown in FIG. 4.
Figure 6:
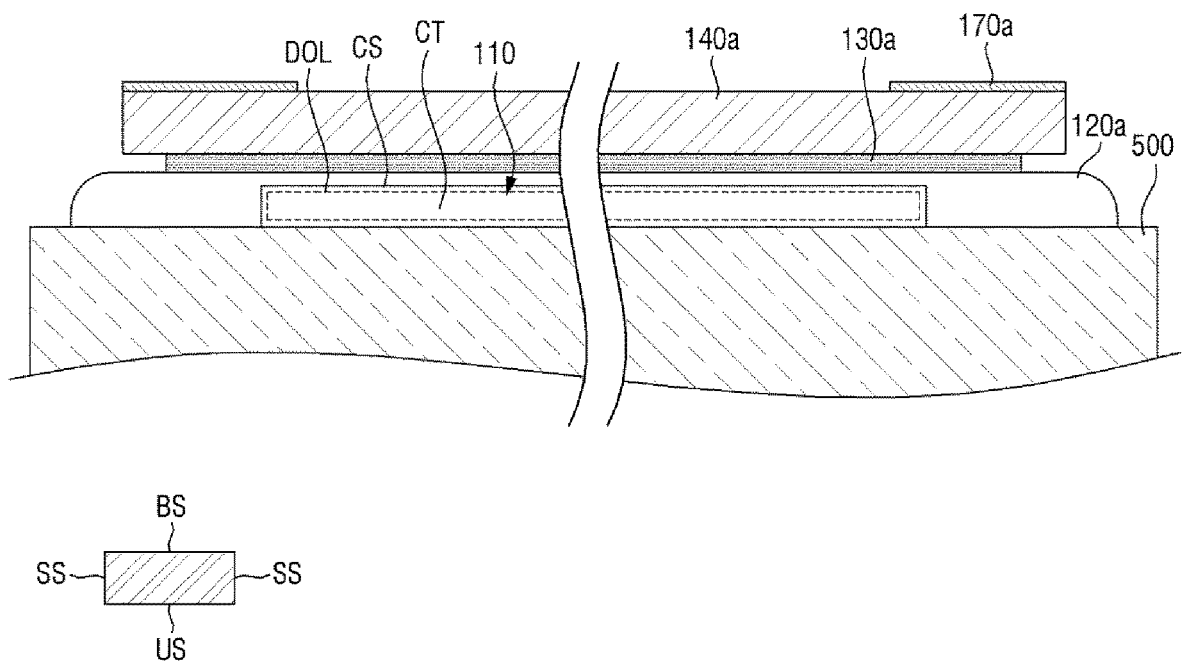
Figure 7:
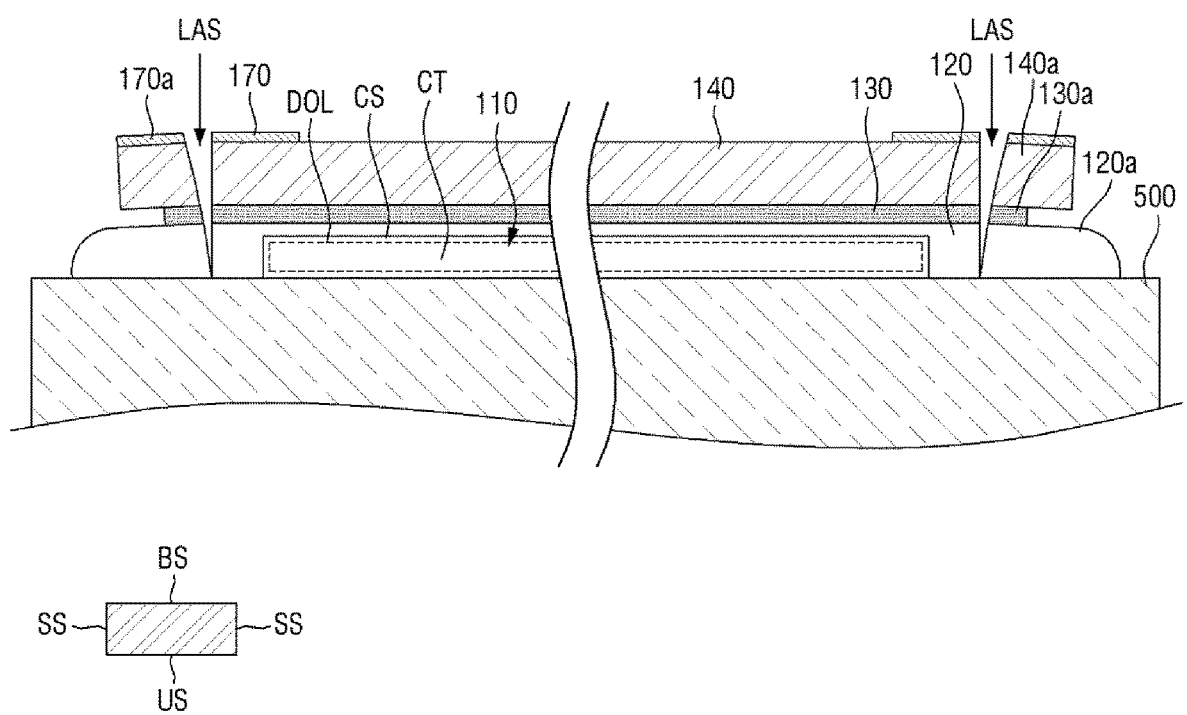

FIGS. 5, 6, and 7 are cross-sectional views showing processing steps of a method of fabricating the protection member shown in FIG. 4.

Initially, referring to FIG. 5, a glass substrate 110 is placed on a stage 500. Subsequently, a functional composition is coated on the bottom surface BS (the surface facing the upper side of the drawing) of the glass substrate 110 and then is cured to form a functional coating layer 120a. The functional composition includes a liquid resin and may be coated by slit coating, bar coating, spin coating, glass direct molding, glass direct printing, etc. The curing process may include thermal curing or ultraviolet curing. The cured functional coating layer 120a may have a flat bottom surface BS and may completely cover the bottom surface BS and the side surfaces SS of the glass substrate 110. The functional coating layer 120 may protrude outwardly from the side surfaces SS of the glass substrate 110 by a considerable distance. The outer surfaces SS of the functional coating layer 120a in this step may have, but is not limited to, an acute angle.

Subsequently, referring to FIG. 6, a coupling layer 130a and a film layer 140a are stacked on the bottom surface BS of the functional coating layer 120a. The coupling layer 130a is coupled with the film layer 140a and then they may be stacked on the functional coating layer 120a by a lamination technique. As another example, the coupling layer 130a may be coated or laminated on the functional coating layer 120a, and then the film layer 140a may be disposed thereon to form the stacked structure. The print layer 170a may be formed on the film layer 140a after the film layer 140a is stacked. Alternatively, the print layer 170a may be formed on the film layer 140a and then the film layer 140a may be stacked, such that the stacked structure as shown in FIG. 6 may be formed.

The width of each of the film layer 140a and the coupling layer 130a may be larger than the width of the glass substrate 110 so that they may protrude outward from the side surfaces SS of the glass substrate 110. The positional relationship among the side surfaces SS of the functional coating layer 120a, the coupling layer 130a and the film layer 140a can be variously modified. In the illustrated example, the functional coating layer 120a protrudes most outward and the film layer 140a protrudes more than the coupling layer 130a. However, their side surfaces SS may be aligned with one another or may protrude differently.

Referring to FIG. 7, the stacked structure shown in FIG. 6 is cut, so that the protection member 100_1 as shown in FIG. 4 is completed. The edge portion of the stacked structure is cut at a point located outwardly from the side surfaces SS of the glass substrate 110. The cutting process may include cutting the film layer 140a, the coupling layer 130a and the functional coating layer 120a altogether. Each of them is partially cut, thereby a first film layer 140, a first coupling layer, and a first functional coating layer 120 are formed, respectively, but the glass substrate 110 is not cut. The cutting may be performed by, but is not limited to, laser (LAS) irradiation. The cutting also may be performed by cutting with knife or other cutting means.

The side surface SS of the completed protection member 100_1 becomes cutting surfaces by the cutting process, and the layers exposed on the side surfaces SS may be aligned with one another. Even if the side surfaces SS of the functional coating layer 120a have an acute angle before the cutting, the side surfaces SS of the first functional coating layer 120 completed by the cutting may have a right angle with respect to the upper surface US and the bottom surface BS.

Usually, the cutting process may transfer certain stresses to or otherwise impact the object to be cut. Accordingly, if the glass substrate 110 itself is cut, the stress or impact may be directly transferred to the glass substrate 110, which may cause breakage or decrease in strength. In addition, as the tempered glass has a compressive stress region CS from the surface, if a part of it is cut, the compressive stress region CS is removed and the internal stress profile is also changed accordingly. For example, if the tempered glass itself is cut, the strength may be reduced by 3 to 10 times.

In contrast, when the functional coating layer 120a located outwardly from the glass substrate 110 is cut as in the illustrated example, the impact is not directly transmitted to the glass substrate 110. In addition, since the glass substrate 110 itself is not cut, the compressive stress region CS located near the side surfaces SS of the glass substrate 110 may also be maintained without any significant change. Therefore, according to the above-described method, it is possible to form the protection member 100_1 with the side surfaces SS aligned without decreasing the strength of the glass substrate 110. The print layer 170a may also be cut together in this step. In such case, the outer surfaces SS of the first print layer 170 may also be aligned with the side surfaces SS of each of the first functional coating layer 120, the first coupling layer 130, and the first film layer 140.

In order to fabricate the protection member 100 according to the exemplary embodiment shown in FIG. 3, the step of FIG. 6 may be omitted, and the cutting step may be performed immediately after the functional coating layer 120a is formed.

Although the film layer 140 is further disposed on the bottom surface of the protection member according to the exemplary embodiment shown in FIG. 3 in the exemplary embodiment shown in FIG. 4, more layers may be further disposed thereon while maintaining the side surfaces even. Hereinafter, a more detailed description thereon will be made.

Figure 8:
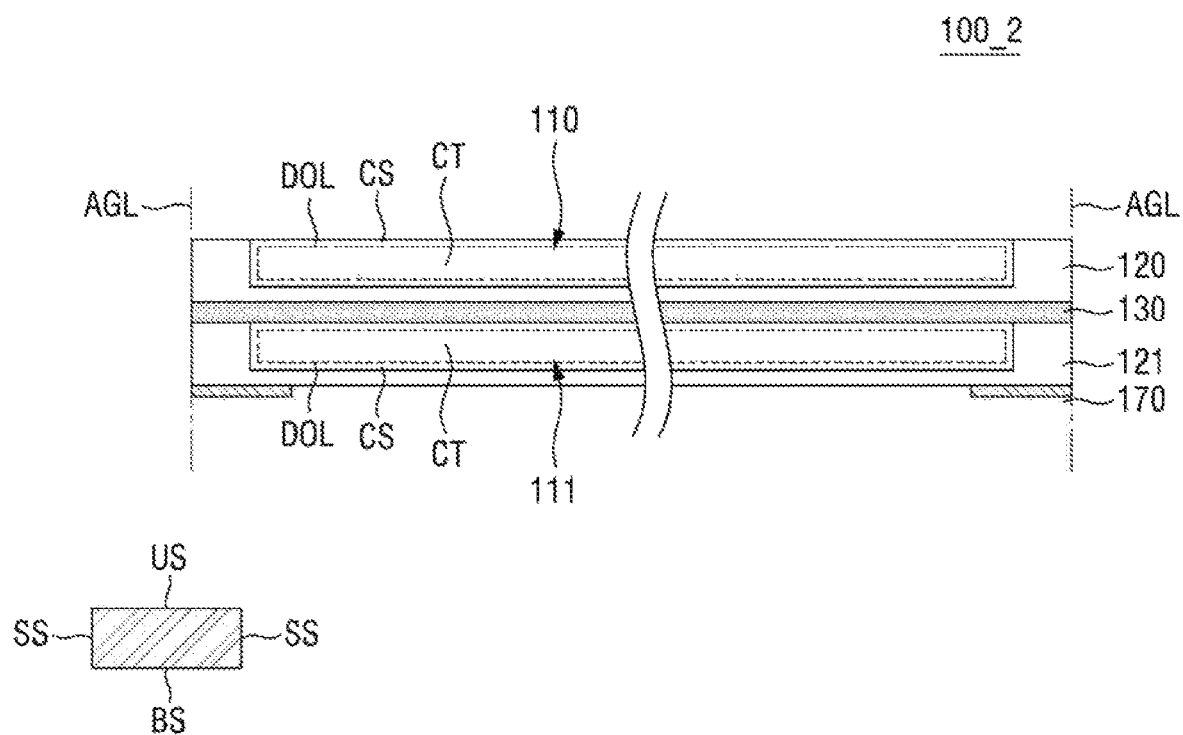
FIG. 8 is a cross-sectional view of still another exemplary embodiment of a protective member constructed according to the principles of the invention.

FIG. 8 is a cross-sectional view of still another exemplary embodiment of a protection member constructed according to the principles of the invention. The exemplary embodiment shown in FIG. 8 includes more than one protection member 100 as shown in FIG. 3.

Referring to FIG. 8, a protection member 100_2 according to this exemplary embodiment includes a first glass substrate 110, a first functional coating layer 120 covering the bottom surface BS and the side surface SS of the first glass substrate 110, a coupling layer 130 disposed on the bottom surface BS of the first functional coating layer 120, a second glass substrate 111 disposed on the bottom surface BS of the coupling layer 130, and a second functional coating layer 121 covering the bottom surface BS and the side surfaces SS of the second glass substrate 111. In this exemplary embodiment, the first glass substrate 110, the first functional coating layer 120 and the coupling layer 130 are substantially identical to the glass substrate 110, the functional coating layer 120 and the coupling layer 130 of FIG. 4 described above, which are denoted by the like reference numerals.

The second glass substrate 111 and the second functional coating layer 121 are substantially identical to the first glass substrate 110 and the first functional coating layer 120, respectively, except for their positions. The upper surface US of the second glass substrate 111 and the upper surface US of the second functional coating layer 121 are coupled with the bottom surface BS of the coupling layer 130. The bottom surface BS of the coupling layer 130 is in contact with the upper surface US of the second glass substrate 111 and the upper surface US of the second functional coating layer 121. The side surfaces SS of the first functional coating layer 120, the coupling layer 130 and the second functional coating layer 121, which form the side surfaces SS of the protection member 100_2, may be aligned with one another. This may be because the side surfaces SS are formed as the elements are cut after they have been stacked, similarly to the method of FIGS. 5 to 7 described above. The print layer 170 may be disposed on the bottom surface BS of the second functional coating layer 121 as shown in the drawings, this is merely illustrative.

In FIG. 8, the side surfaces SS of the first glass substrate 110 may be aligned with the side surfaces SS of the second glass substrate 111 in the thickness direction, which are located inwardly from the side surfaces SS of the protection member 100_2. However, they may not be aligned with each other in other implementations.

According to this exemplary embodiment, the protection member 100_2 includes two or more glass substrates 110 and 111, the strength of the protection member 100_2 can be increased while the layers forming the side surfaces SS can be aligned. As a result, when the protection member 100_2 is attached to the display panel 200 and then is installed in a display device set, the assembly tolerance can be reduced, so that the process efficiency can be improved.

Figure 9:
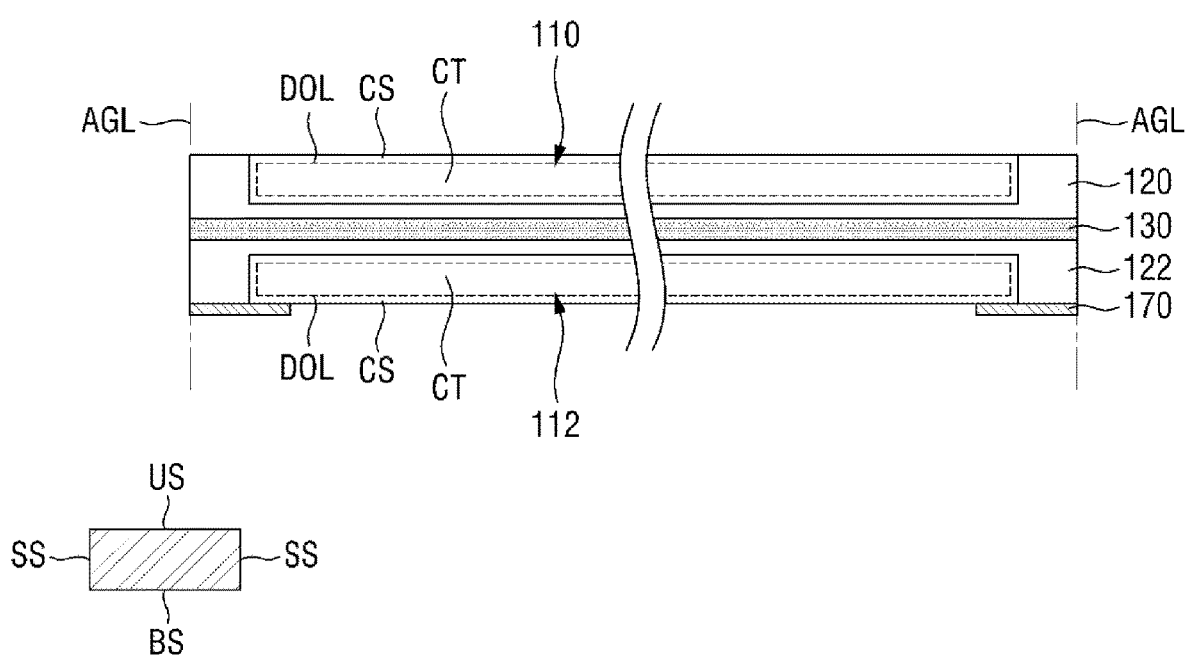
FIG. 9 is a cross-sectional view of still another exemplary embodiment of a protective member constructed according to the principles of the invention.

FIG. 9 is a cross-sectional view of still another exemplary embodiment of a protection member constructed according to the principles of the invention.

A protection member 100_3 according to the exemplary embodiment shown in FIG. 9 is substantially identical to the exemplary embodiment of FIG. 8 except that the positions of a second glass substrate 112 and a second functional coating layer 122 in the thickness direction are switched relative to each other. The upper surface US and the bottom surface BS of each of the second glass substrate 112 and the second functional coating layer 122 of FIG. 9 are inverted from the upper surface US and the bottom surface BS of each of the second glass substrate 111 and the second functional coating layer 121 of FIG. 8, respectively. According to this exemplary embodiment, the second glass substrate 112 and the second functional coating layer 122 covering the upper surface US and the side surfaces SS may be symmetrical to the first glass substrate 110 and the first functional coating layer 120 covering the bottom surface BS and the side surfaces SS, with respect to the coupling layer 130. Accordingly, the bottom surface BS of the coupling layer 130 is in contact with the upper surface of the second functional coating layer 122 and is spaced from the upper surface of the second glass substrate 122.

According to this exemplary embodiment, the print layer 170 may be disposed on the bottom surface BS of the second functional coating layer 122 and may extend to overlap some portions of the bottom surface BS of the second glass substrate 112.

According to this exemplary embodiment, the protection member 100_3 includes two or more glass substrates 110 and 112, the strength of the protection member 100_2 can be increased while the layers forming the side surfaces SS can be aligned. As a result, when the protection member 100_3 is attached to the display panel 200 and then is installed in a display device set, the assembly tolerance can be reduced, so that the process efficiency can be improved.

Figure 10:
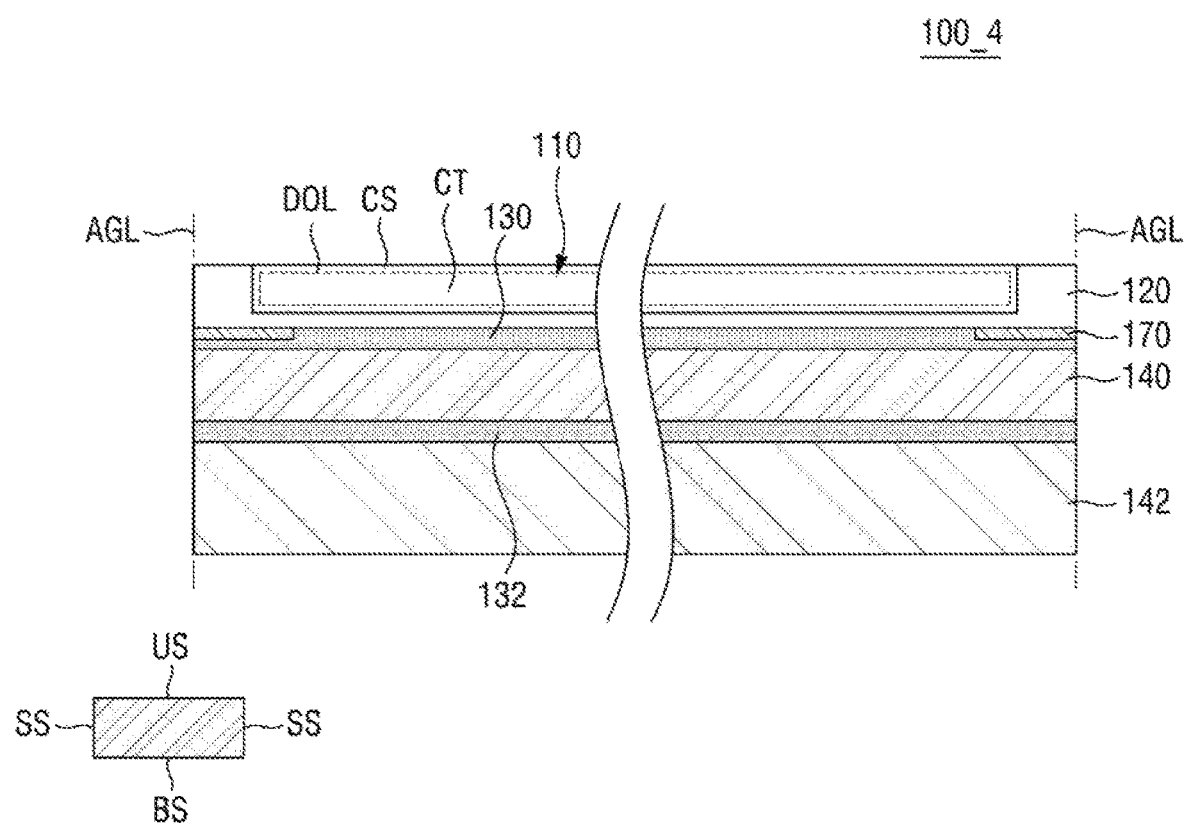
FIG. 10 is a cross-sectional view of still another exemplary embodiment of a protective member constructed according to the principles of the invention.

FIG. 10 is a cross-sectional view of still another exemplary embodiment of a protection member constructed according to the principles of the invention.

According to the exemplary embodiment shown in FIG. 10, more layers may be disposed on the bottom surface BS of a protection member 100_4 of FIG. 4.

Referring to FIG. 10, a protection member 100_4 according to this exemplary embodiment includes a first glass substrate 110, a first functional coating layer 120 covering the bottom surface BS and the side surface SS of the first glass substrate 110, a first coupling layer 130 disposed on the bottom surface BS of the first functional coating layer 120, a first film layer 140 disposed on the bottom surface BS of the first coupling layer 130, a second coupling layer 132 disposed on the bottom surface BS of the first film layer 140, and a second film layer 142 disposed on the bottom surface BS of the second coupling layer 132. The first coupling layer 130 and the first film layer 140 are substantially identical to the coupling layer 130 and the film layer 140 according to the exemplary embodiment of FIG. 4 described above, which are denoted by the like reference numerals.

The second coupling layer 132 serves to couple the second film layer 142 to the first film layer 140. The second coupling layer 132 may be made of the same material as the first coupling layer 130. The second film layer 142 may include the same film as the first film layer 140 or may include a different film. The second film layer 142 may prevent scattering of splinters like the first film layer 140, but this is merely illustrative. Any film having a variety of functions may be employed. For example, an impact-absorbing film, a UV-blocking film, a touch sensor film, or a pressure-sensitive film may be employed as the second film layer 142. In the exemplary embodiment of FIG. 10, the print layer 170 is illustrated as being disposed on the bottom surface BS of the first functional coating layer 120.

According to the exemplary embodiment, by cutting the edge portion after all of the layers have been stacked, the side surfaces of the first functional coating layer 120, the first coupling layer 130, the first film layer 140, the second coupling layer 132 and the second film layer 142 can be aligned with one another. As a result, when the protection member is installed in a set of a display device, the assembly tolerance can be reduced, so that the process efficiency can be improved.

Figure 11:
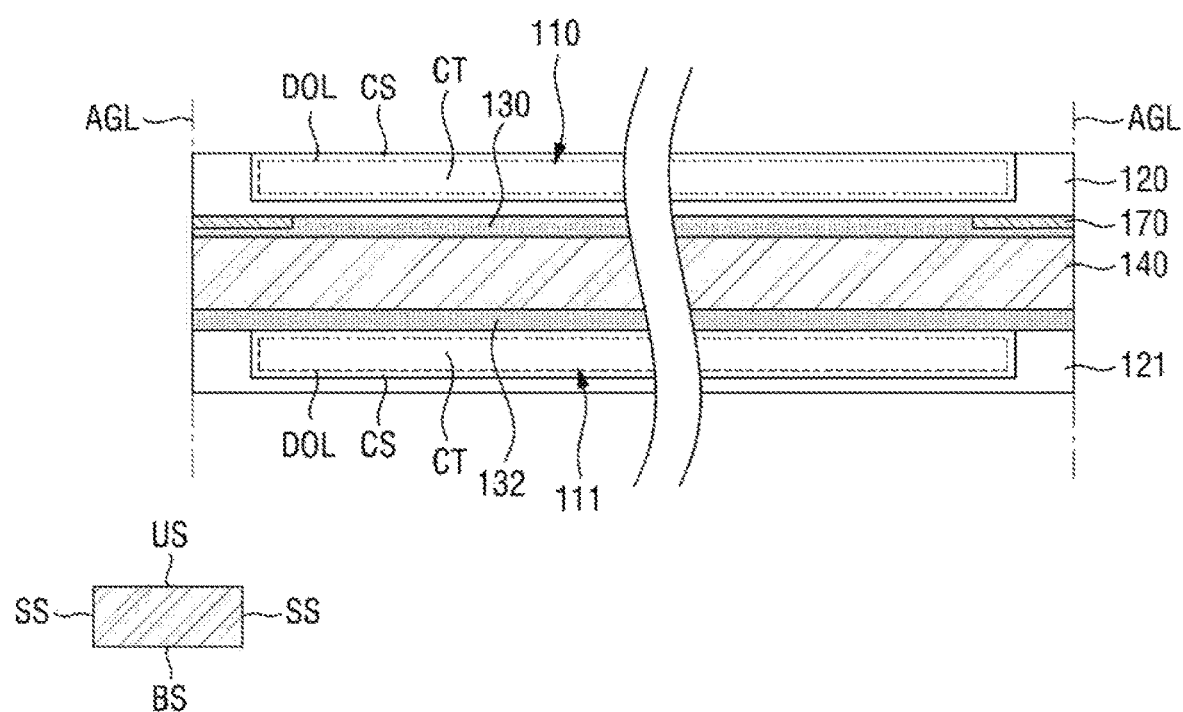
FIGS. 11 and 12 are cross-sectional views of still other exemplary embodiments of protective member constructed according to the principles of the invention.
Figure 12:
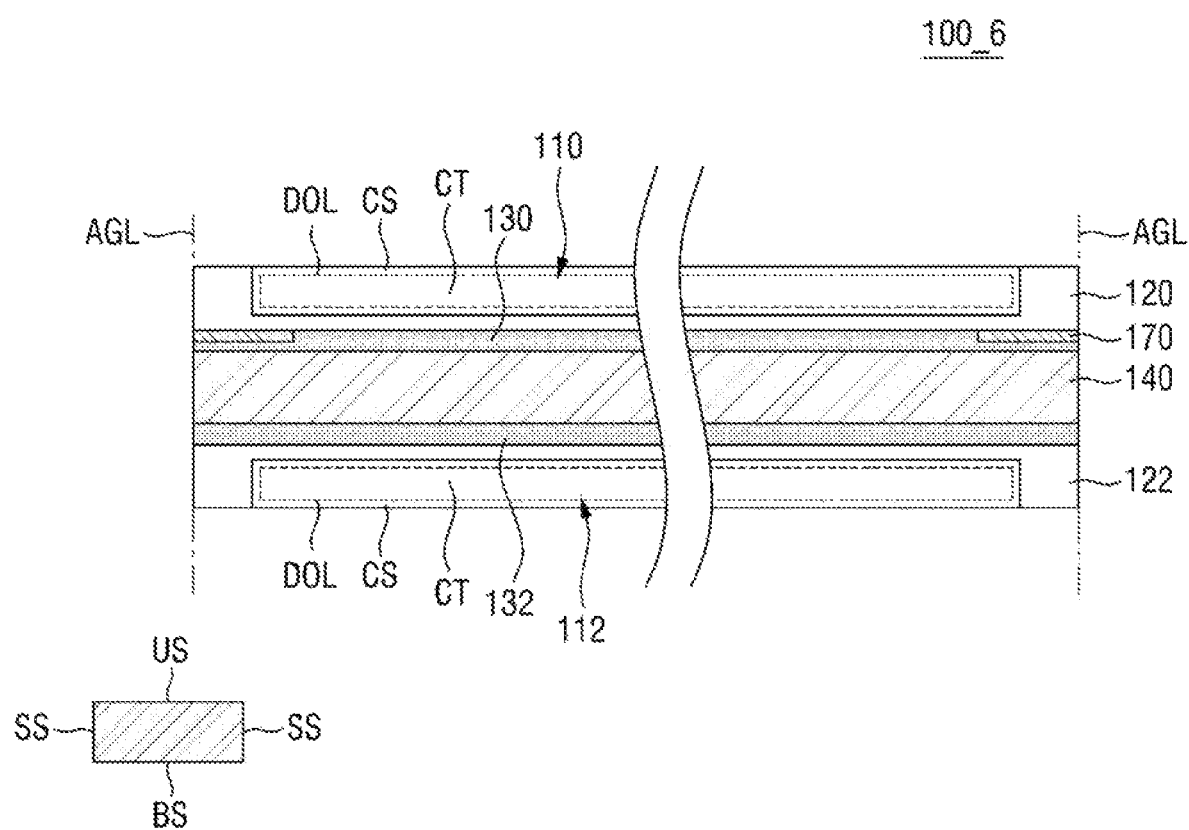

FIGS. 11 and 12 are cross-sectional views of still other exemplary embodiments of protection member constructed according to the principles of the invention. The exemplary embodiments of FIGS. 11 and 12 illustrate that a protection member 100_5; 100_6 may include a plurality of glass substrates 110, 111 and 112 and film layers 140.

In the protection member 100_5 according to the exemplary embodiment of FIG. 11, the second coupling layer 132 is disposed on the bottom surface BS of the first film layer 140 like the exemplary embodiment of FIG. 10, and a second glass substrate 111 and a second functional coating layer 121 covering the bottom surface BS and the side surfaces SS of the second glass substrate 111 are disposed on the bottom surface BS of the second coupling layer 132 like the exemplary embodiment of FIG. 8.

The protection member 100_6 according to the exemplary embodiment of FIG. 12 is different from the exemplary embodiment of FIG. 11 in that the second glass substrate 112 and the second functional coating layer 122 covering the bottom surface BS and the side surfaces SS of the second glass substrate 112 shown in FIG. 9 are provided, instead of the second glass substrate 111 and the second functional coating layer 121 of FIG. 11. In this embodiment, the second glass substrate does not contact the second coupling layer 132.

Also in the exemplary embodiments of FIGS. 11 and 12, by cutting the edge portion after all of the layers have been stacked, the side surfaces SS of the layers can be aligned with one another. As a result, when the protection member is installed in a display device set, the assembly tolerance can be reduced, so that the process efficiency can be improved.

Figure 13:
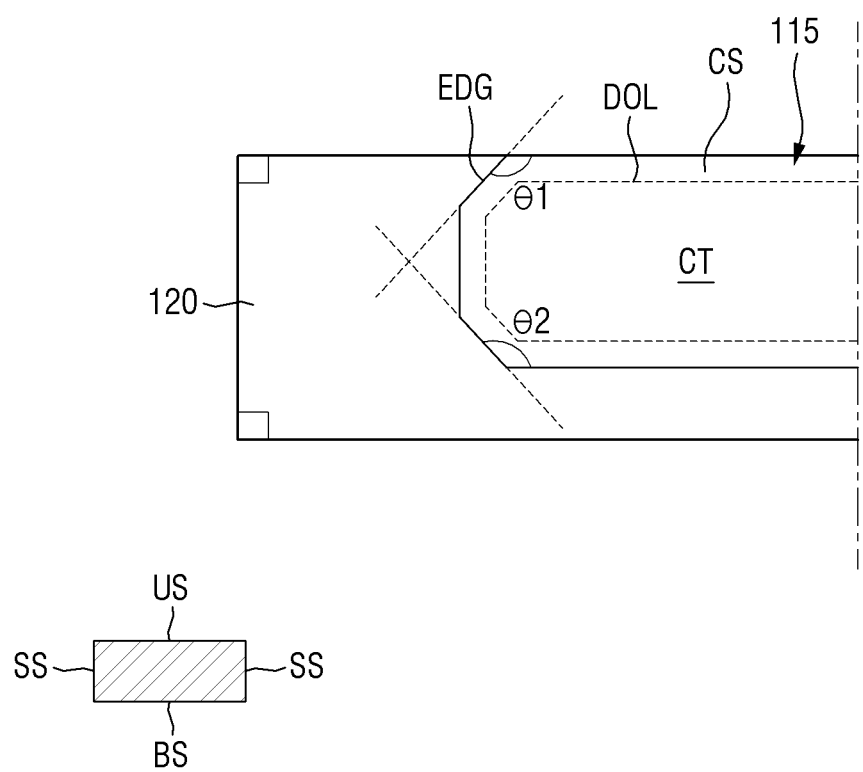
FIG. 13 is a cross-sectional view of a part of an exemplary embodiment of a protective member constructed according to the principles of the invention.

FIG. 13 is a cross-sectional view of a part of an exemplary embodiment of a protection member constructed according to the principles of the invention.

A protection member 100_7 according to the exemplary embodiment of FIG. 13 is different from that according to the exemplary embodiment of FIG. 3 in that the edges (the portions where two or more faces meet, EDG) of the glass substrate 115 are chamfered. Specifically, a mother substrate of the glass substrate 115 is chopped into cells, and then the cut portions may be chamfered or rounded by polishing or cutting them, so as to prevent the damage of the edges. The edges EDG may have obtuse angles $\theta 1$ and $\theta 2$ with respect to the adjacent faces (upper surface US and side surfaces SS in the drawings).

It should be noted that the functional coating layer 120 covers the edges EDG of the glass substrate 110 but does not conform to the shape of the substrate 110. In other words, the side surfaces SS of the functional coating layer 120 may be formed by cutting and may have a right angle with respect to the upper surface US and the bottom surface BS.

The glass substrate 115 of FIG. 13 may be replaced with the glass substrates 110, 111 and 112 shown in FIGS. 3 to 12.

Figure 14:
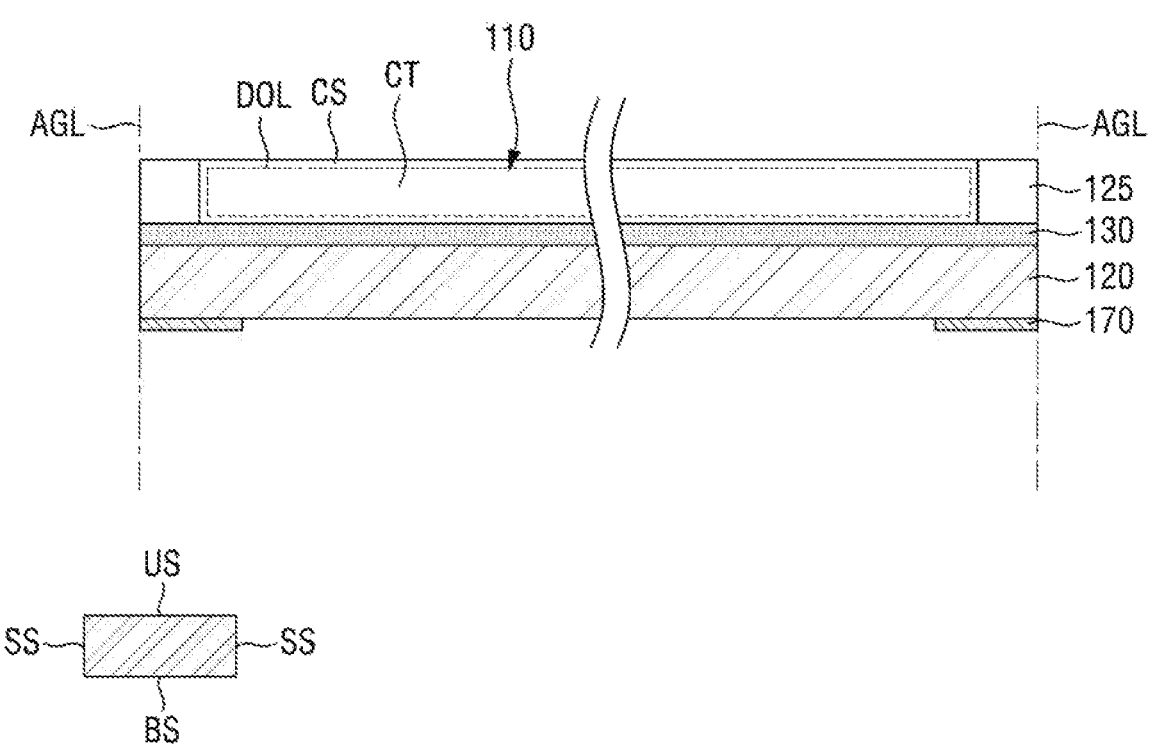
FIG. 14 is a cross-sectional view of still another exemplary embodiment of a protective member constructed according to the principles of the invention.

FIG. 14 is a cross-sectional view of still another exemplary embodiment of a protection member constructed according to the principles of the invention.

A protection member 100_8 according to the exemplary embodiment shown in FIG. 14 is different from the exemplary embodiment shown in FIG. 4 in that a functional coating layer 125 is disposed only on the side surfaces SS of a glass substrate 110.

Specifically, the functional coating layer 125 is disposed along the edge of the glass substrate 110 when viewed from the top, and does not overlap with the glass substrate 110 in the thickness direction. The upper surface US of the functional coating layer 125 may be in substantially the same plane as the upper surface US of the glass substrate 110, and the bottom surface BS of the functional coating layer 125 may be in substantially the same plane as the bottom surface BS of the glass substrate 110. The thickness of the functional coating layer 125 may be substantially equal to the thickness of the glass substrate 110. The bottom surface BS of the glass substrate 110 is exposed without being covered by the functional coating layer 125. The coupling layer 130 is attached to the bottom surface BS of the functional coating layer 125 and the bottom surface BS of the glass substrate 110.

According to this exemplary embodiment, the side surfaces SS of the glass substrate 110 do not form the side surfaces SS of the protection member 100_8, like the above-described exemplary embodiments. That is to say, the side surfaces SS of the glass substrate 110 are covered and protected by the functional coating layer 125, and the side surfaces SS of the protection member 100 are formed with the functional coating layer 125, the coupling layer 130 and the film layer 140, which can be aligned with one another. Therefore, the assembly tolerance can be reduced during the process of attaching the protection member 100_8 to the display panel 200 and installing it in the set of the display device 10, so that the process efficiency is improved.

The protection members 100 to 100_8 according to above-described exemplary embodiments can be made more flexible since they have aligned side surface SS and thus are easy to assemble without loss of strength. Therefore, the protection members according to the exemplary embodiments can be advantageously applied to a flexible display device such as a foldable display device. A foldable display device employing the protection members 100 to 100_8 will be described with reference to FIGS. 15 and 16.

Figure 15:
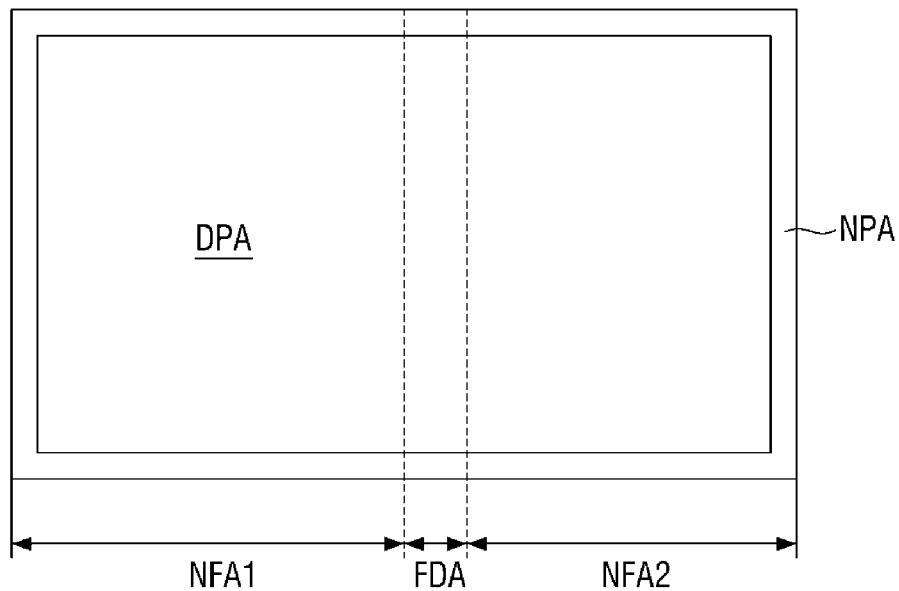
FIG. 15 is a plan view of another exemplary embodiment of a display device constructed according to the principles of the invention.
Figure 16:
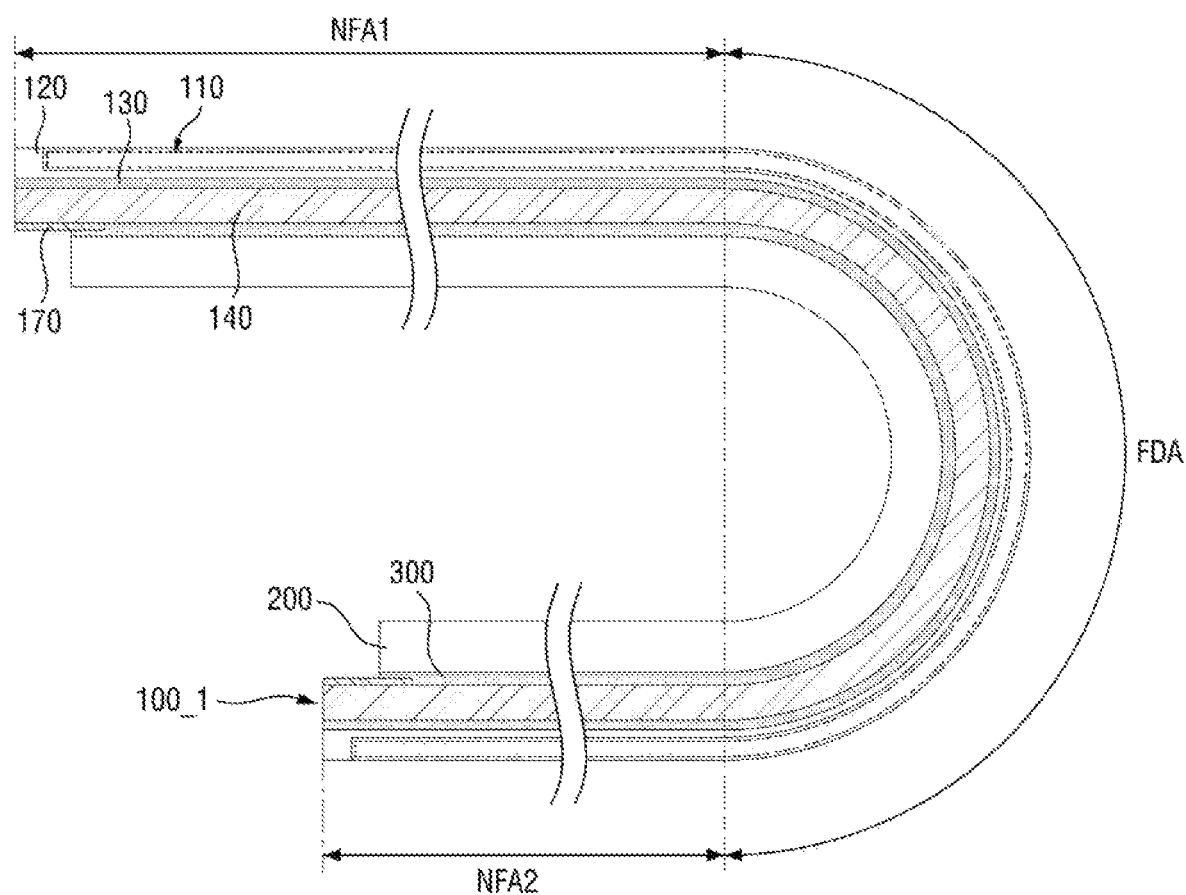
FIG. 16 is a cross-sectional view of the display device of FIG. 15 when it is folded.

FIG. 15 is a plan view of another exemplary embodiment of a display device constructed according to the principles of the invention. FIG. 16 is a cross-sectional view of the display device of FIG. 15 when it is folded. The protection member 100_1 according to the exemplary embodiment of FIG. 4 is employed in the display device of FIG. 16 as an example.

Referring to FIGS. 15 and 16, a display device 11 may include a folding area FDA, a first unfolded area NFA1, and a second unfolded area NFA2. The folding area FDA can be actually bent and folded and may traverse the center of the display device 10. The first unfolded area NFA1 and the second unfolded area NFA2 may be separated from each other with the folding area FDA therebetween. Although the width of the first unfolded area NFA1 is different that of the second unfolded area NFA2 in the drawings, they may have the same width.

The display device 11 may have an in-folding design that the display surface folds inward and/or an out-folding design that the display surface folds outward. FIG. 16 shows an example of a display device when it is folded outward.

Referring to FIG. 16, when the display device 11 is folded, the display panel 200 and the protection member 100_1 are bent together in the folding area FDA. The protection member 100_1 may be repeatedly folded and unfolded in the folding area FDA. As described above, the glass substrate 110 of the applied protection member 100_1 is not directly damaged by cutting and thus the strength is not decreased, so that a more flexible (e.g., thinner) protection member 100_1 can be employed. As a result, it is possible to reduce the risk of breakage. In addition, by employing a coupling layer 130 that can creep and the functional coating layer 120, it is possible to alleviate the transfer of the stress due to the bending between the stacked structures, and to reduce the residual stress. As a result, the possibility of breakage of the protection member 100_1 can be further reduced. Also, even if the glass substrate 110 is broken, scattering of splinters can be prevented by the film layer 140, so that it is possible to prevent the risk that a user is injured.

Hereinafter, the above-described exemplary embodiments will be described in more detail with reference to Examples and Experimental Examples.

Example 1

A protection member having the structure shown in FIG. 4 was fabricated by the method of FIGS. 5 to 7 by using a glass substrate having the thickness of about 50 μm.

Examples 2 to 4

The protection members shown in FIGS. 8, 10 and 11 were fabricated by applying the method of FIGS. 5, 6, and 7.

Comparative Example 1

A coupling layer is laminated on a first film layer, and a second film layer is attached thereon, such that a protection member according to Comparative Example 1 was fabricated.

Comparative Example 2

A coupling layer is laminated on a glass substrate having the thickness of about 50 μm, and a film layer is laminated thereon, such that a protection member according to Comparative Example 2 was fabricated.

Experimental Example 1

Check Lamination Tolerance

The unevenness of the side surfaces of the protection members according to Examples 1 to 4 and Comparative Examples 1 and 2 were observed by the naked eyes.

Experimental Example 2

Impact Resistance Properties

Pen drop experiments were performed on the protection members according to Examples 1, 2, 3, and 4 and Comparative Examples 1 and 2. Pens were dropped onto the protection members by incrementing the height by a centimeter to see the height at which the protection members were broken and/or the height at which the protection members were scratched.

The results of Experimental Example 1 and Experimental Example 2 are shown in Table 1 below:

TABLE 1

| Examples | Lamination Tolerance | Impact Resistance Properties |
|---|---|---|
| Example 1 | None (aligned side surfaces) | Breakage at height of 3 cm |
| Example 2 | None (aligned side surfaces) | Breakage at height of 7 cm |
| Example 3 | None (aligned side surfaces) | Breakage at height of 9 cm |
| Example 4 | None (aligned side surfaces) | Breakage at height of 14 cm |
| Comparative Example 1 | Yes (protrusion) | Scratch at height of 1 cm Breakage at height of 6 cm |
| Comparative Example 2 | Yes (protrusion) | Breakage at height of 2 cm |

It can be seen from Table 1 that there were protrusions of each layer on the side surfaces due to the lamination tolerances according to Comparative Examples 1 and 2. In contrast, there were no protrusions according to Examples 1, 2, 3, and 4 since the side surfaces were formed by cutting. In addition, Examples 1, 2, 3, and 4 generally exhibited better impact resistance properties than Comparative Example 2. Although the impact resistance properties of Comparative Example 1 was not bad since it was broken when the pen was dropped at the height of 6 cm, there was a scratch when the pen was dropped at the height of 1 cm. There was no scratch on the surface in all other examples than Comparative Example 1 until the protection members were broken.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A protection member for a display device, comprising:
a first glass substrate having a first surface and a second surface opposed to each other in a thickness direction and side surfaces;
a first coating layer covering and in contact with the side surfaces of the first glass substrate, and including a first surface and a second surface opposed to each other in the thickness direction and having side surfaces,
a first coupling layer disposed on the second surface of the first coating layer;
a second glass substrate disposed on a second surface of the first coupling layer; and
a second coating layer covering side surfaces of the second glass substrate and a second surface of the second glass substrate, the second coating layer contacting the side surfaces of the second glass substrate and the second surface of the second glass substrate,
wherein the first surface of the first glass substrate is exposed via the first coating layer, and the first surface of the first coating layer is located in substantially the same extended plane of the first surface of the first glass substrate, and
wherein the side surfaces of the first coating layer, side surfaces of the first coupling layer and side surfaces of the second coating layer are all aligned in substantially the same plane.

2. The protection member of claim 1,
wherein the second surface of the first coating layer is substantially parallel to the first surface of the first coating layer and the first surface of the first glass substrate.

3. A protection member for a display device, comprising:
a first glass substrate having a first surface and a second surface opposed to each other in a thickness direction and side surfaces;
a first coating layer covering and in contact with the side surfaces of the first glass substrate, and including a first surface and a second surface opposed to each other in the thickness direction and having side surfaces,
a first coupling layer disposed on the second surface of the first coating layer; and a first film layer disposed on a second surface of the first coupling layer,
a second coupling layer disposed on a second surface of the first film layer; and
a second film layer disposed on a second surface of the second coupling layer,
wherein the first surface of the first glass substrate is exposed via the first coating layer, and the first surface of the first coating layer is located in substantially the same extended plane of the first surface of the first glass substrate, and wherein the side surfaces of the first coating layer, side surfaces of the first coupling layer, side surfaces of the first film layer, side surfaces of the second coupling layer and side surfaces of the second film layer are all aligned in substantially the same alignment plane.

4. A protection member for a display device, comprising:

a first glass substrate having a first surface and a second surface opposed to each other in a thickness direction and side surfaces;

a first coating layer covering and in contact with the side surfaces of the first glass substrate, and including a first surface and a second surface opposed to each other in the thickness direction and having side surfaces, a first coupling layer disposed on the second surface of the first coating layer; and a first film layer disposed on a second surface of the first coupling layer, a second coupling layer disposed on a second surface of the first film layer;

a second glass substrate disposed on a second surface of the second coupling layer; and a second coating layer covering side surfaces of the second glass substrate and the second surface of the second glass substrate, the second coating layer contacting the side surfaces of the second glass substrate and the second surface of the second glass substrate;

wherein the first surface of the first glass substrate is exposed via the first coating layer, and the first surface of the first coating layer is located in substantially the same extended plane of the first surface of the first glass substrate, and wherein the side surfaces of the first coating layer, side surfaces of the first coupling layer, side surfaces of the first film layer, side surfaces of the second coupling layer and side surfaces of the second coating layer are all aligned in substantially the same plane.

5. A protection member for a display device, comprising:

a first glass substrate having a first surface and a second surface opposed to each other in a thickness direction and side surfaces;

a first coating layer covering and in contact with the side surfaces of the first glass substrate, and including a first surface and a second surface opposed to each other in the thickness direction and having side surfaces, a first coupling layer disposed on the second surface of the first coating layer; and a first film layer disposed on a second surface of the first coupling layer, a second coupling layer disposed on a second surface of the first film layer; and a second glass substrate and a second coating layer disposed on a second surface of the second coupling layer, wherein the first surface of the first glass substrate is exposed via the first coating layer, and the first surface of the first coating layer is located in substantially the same extended plane of the first surface of the first glass substrate, wherein the second coating layer covers side surfaces of the second glass substrate and a first surface of the second glass substrate, the second coating layer contacts the side surfaces of the second glass substrate and the first surface of the second glass substrate, a second surface of the second coupling layer contacts a first surface of the second coating layer, and wherein the side surfaces of the first coating layer, side surfaces of the first coupling layer, side surfaces of the first film layer, side surfaces of the second coupling layer and side surfaces of the second coating layer are all aligned in substantially the same plane.

6. A protection member for a display device, comprising:

a first glass substrate having a first surface and a second surface opposed to each other in a thickness direction and side surfaces;

a first coating layer covering and in contact with the side surfaces of the first glass substrate, and including a first surface and a second surface opposed to each other in the thickness direction and having side surfaces, a first coupling layer disposed on the second surface of the first coating layer; and a second glass substrate and a second coating layer disposed on a second surface of the first coupling layer, wherein the first surface of the first glass substrate is exposed via the first coating layer, and the first surface of the first coating layer is located in substantially the same extended plane of the first surface of the first glass substrate, wherein the second coating layer covers side surfaces of the second glass substrate and a first surface of the second glass substrate, the second coating layer contacts the side surfaces of the second glass substrate and the first surface of the second glass substrate, wherein a second surface of the first coupling layer contacts a first surface of the second coating layer, and wherein the side surfaces of the first coating layer, side surfaces of the first coupling layer and side surfaces of the second coating layer are all aligned in substantially the same plane.

7. The protection member of claim 1, wherein the first glass substrate comprises a compressive stress region near an outer surface thereof and a central tensile region therein, and wherein the compressive stress region is disposed near the first surface of the first glass substrate, the second surface of the first glass substrate and the side surfaces SS of the first glass substrate.

8. The protection member of claim 1, wherein the first coating layer is a functional coating layer comprising at least one of: an epoxy acrylate resin, a polyester acrylate resin, a polyether acrylate resin, a urethane acrylate resin, an acryl acrylate resin, an unsaturated polyester, a urethane resin, an acrylonitrile butadiene styrene (ABS) resin, and a rubber.

9. The protection member of claim 1, wherein the side surfaces of the first coating layer are formed by cutting.

10. A display device comprising:

a display panel; and a protection member disposed on a surface of the display panel, wherein the protection member comprises a glass substrate having a first surface and a second surface opposed to each other in a thickness direction and side surfaces, a coating layer covering and directly contacting the side surfaces of the glass substrate, the coating layer including a first surface and a second surface opposed to each other in the thickness direction and side surfaces, a coupling layer disposed on a second surface of the coating layer, and a film layer disposed on a second surface of the coupling layer, a second coupling layer disposed on a second surface of the film layer; and a second film layer disposed on a second surface of the second coupling layer, wherein the side surfaces of the coating layer, side surfaces of the coupling layer, side surfaces of the first film layer, side surfaces of the second coupling layer and side surfaces of the second film layer are all aligned in substantially the same alignment plane.

11. The display device of claim 10, wherein side surfaces of the protection member extend outwardly from respective side surfaces of the display panel.

12. The display device of claim 10, wherein the glass substrate is tempered glass, and the film layer comprises an anti-scattering film.

13. The display device of claim 10, wherein the coating layer is a functional coating layer comprising at least one of: an epoxy acrylate resin, a polyester acrylate resin, a polyether acrylate resin, a urethane acrylate resin, an acryl acrylate resin, an unsaturated polyester, a urethane resin, an acrylonitrile butadiene styrene (ABS) resin, and a rubber.

14. The display device of claim 10, wherein the display device is a foldable display device, and the coupling layer has creep properties of about 50% to about 800%.

* * * * *